US011473967B2

(12) United States Patent
Fehrenbach et al.

(10) Patent No.: US 11,473,967 B2
(45) Date of Patent: Oct. 18, 2022

(54) PIEZO STACK DRIVE OF A VIBRATION LIMIT SWITCH WITH FRONT-MOUNTED FASTENING MECHANISM

(71) Applicant: VEGA GRIESHABER KG, Wolfach (DE)

(72) Inventors: Dominik Fehrenbach, Rottweil (DE); Julian Epting, Hornberg (DE)

(73) Assignee: Vega Grieshaber KG, Wolfach (DE)

( * ) Notice: Subject to any disclaimer, the term of this patent is extended or adjusted under 35 U.S.C. 154(b) by 189 days.

(21) Appl. No.: 16/936,131

(22) Filed: Jul. 22, 2020

(65) Prior Publication Data
US 2021/0033453 A1    Feb. 4, 2021

(30) Foreign Application Priority Data

Jul. 31, 2019    (DE) .................. 10 2019 120 685.5

(51) Int. Cl.
| | |
|---|---|
| *G01H 11/08* | (2006.01) |
| *G01D 5/48* | (2006.01) |
| *B06B 1/06* | (2006.01) |
| *G01F 23/296* | (2022.01) |
| *G01H 13/00* | (2006.01) |

(52) U.S. Cl.
CPC ............... *G01H 11/08* (2013.01); *G01D 5/48* (2013.01); *B06B 1/06* (2013.01); *G01F 23/2967* (2013.01); *G01H 13/00* (2013.01)

(58) Field of Classification Search
CPC .... G01H 11/08; G01H 13/00; G01F 23/2967; G01D 5/48; B06B 1/06
See application file for complete search history.

(56) References Cited

U.S. PATENT DOCUMENTS

| | | | | |
|---|---|---|---|---|
| 4,918,833 | A | * | 4/1990 | Allard ....................... G01L 9/04 29/595 |
| 8,390,177 | B2 | | 3/2013 | Turner |
| 9,791,310 | B2 | * | 10/2017 | Girardeau .............. G01H 11/08 |
| 2014/0333176 | A1 | * | 11/2014 | Gruhler ............... G01F 23/2968 310/324 |

FOREIGN PATENT DOCUMENTS

| | | |
|---|---|---|
| DE | 101 29 556 A1 | 1/2003 |
| DE | 10 2017 112 167 A1 | 6/2018 |
| DE | 20 2017 006 827 U1 | 8/2018 |

OTHER PUBLICATIONS

GPTO office action for related German application 10 2019 120 685.5 dated May 5, 2020.

* cited by examiner

*Primary Examiner* — Randy W Gibson
*Assistant Examiner* — John M Royston
(74) *Attorney, Agent, or Firm* — William Gray Mitchell

(57) ABSTRACT

An assembly arrangement for connecting a membrane of a vibration sensor with a drive unit such that vibrations of the drive unit are transmitted to the membrane and vibrations of the membrane are transferred to the drive unit, wherein the assembly arrangement is formed as a cylindrical sleeve, having on one end a fastening section for indirectly or directly fastening to the membrane or an element connected with the membrane, and an insertion opening for the drive unit on the other end.

12 Claims, 3 Drawing Sheets

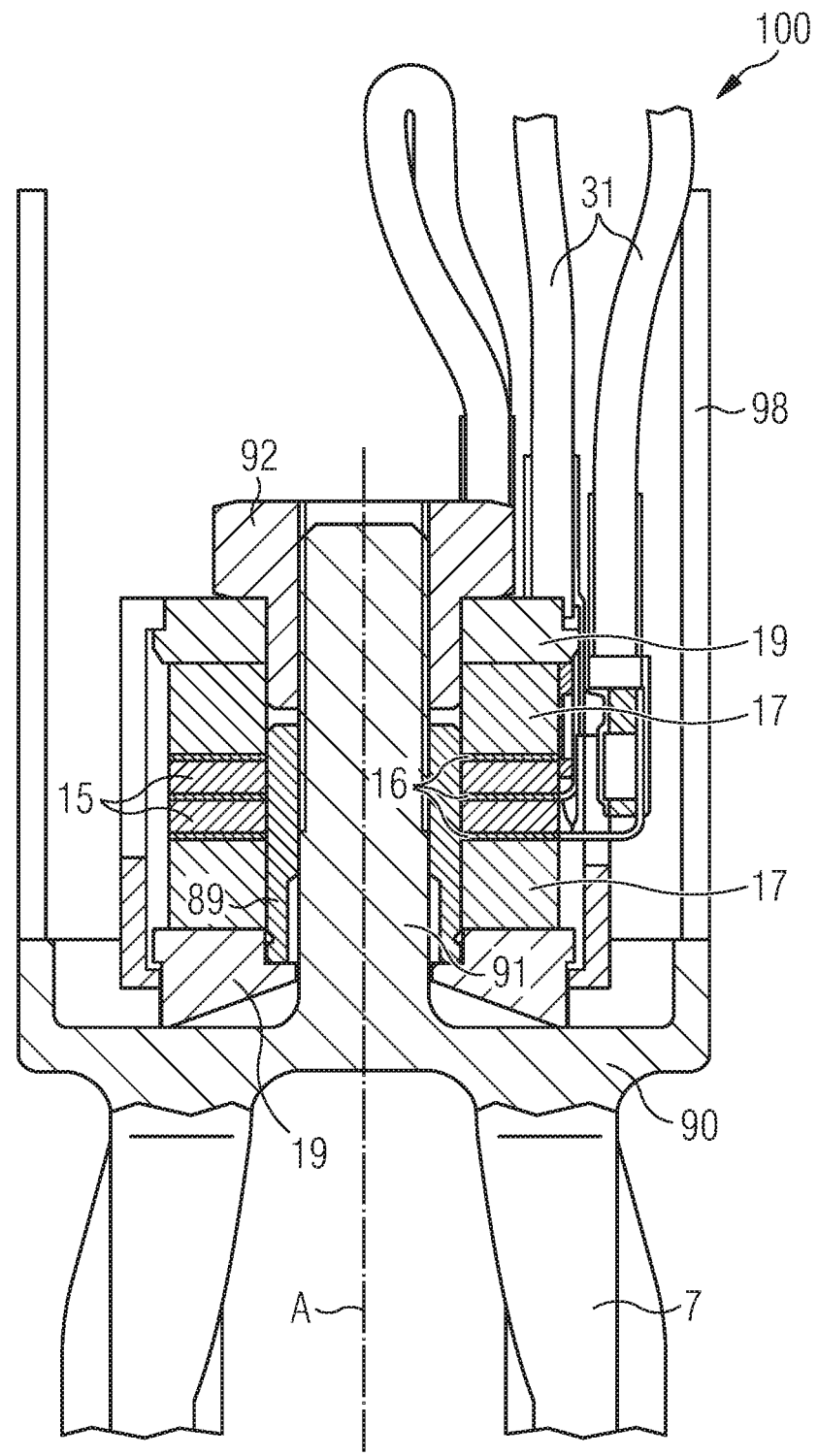
FIG 4   State of the Art

PIEZO STACK DRIVE OF A VIBRATION LIMIT SWITCH WITH FRONT-MOUNTED FASTENING MECHANISM

CROSS REFERENCE TO RELATED APPLICATIONS

This patent application claims priority to German Patent Application 102019120685.5, filed on Jul. 31, 2019.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a piezo stack drive of a vibration limit switch with front-mounted fastening mechanism.

Background of the Invention

Piezo-electric transmitting and/or receiving devices, vibration sensors with such piezo-electric transmitting and/or receiving devices, as well as methods for producing piezo-electric transmitting and/or receiving devices are known from the prior art. Piezo-electric transmitting and/or receiving devices can for example be used as a transmitting and/or receiving device in vibration sensors, which are often used as limit sensors by fill level metrology. Often, such piezo-electric transmitting and/or receiving devices are also referred to as a drive.

The vibration sensor typically comprises a membrane that can be excited to vibrate by a drive, thereby exciting the mechanical vibrator arranged at the membrane to vibrate. Depending on a coverage level of the mechanical vibrator with fill material, as well as depending on the viscosity of this fill material, the mechanical vibrator oscillates with a characteristic frequency, which can be detected by a vibration sensor and can be converted into a measurement signal.

The prior art frequently uses two different types of drives. In a first variant, a multi-segmented piezo element is glued onto the membrane. By applying an electrical voltage to individual or several segments of the piezo element, the latter is excited to cause a bend or torsion that is then transferred onto the membrane, causing the latter to vibrate, thus in turn causing the mechanical vibrator to vibrate. This type of drive generates only a limited stroke and can only be used with vibration sensors employed at temperatures well below the glass transition temperature of the intended adhesive and below the Curie temperature of the intended piezo material. These sensors are not suitable for high-temperature applications above 150° C.

If a sensor with larger stroke is required for an application or is required at higher temperatures, a second variant of drives, so-called piezo stack drives, is used.

In this case, a stack consisting of a piezo unit made of one or more piezo elements, a ceramic adjustment element arranged above and below each of the piezo units, and compression elements arranged above and below the ceramic adjustment elements, is clamped against the membrane by a clamping bolt arranged on the membrane of the sensor and a clamping nut. By applying an electrical voltage to the piezo elements, the latter change their expansion in axial direction of the bolt, thus causing the membrane to vibrate. A known vibration sensor with a piezo stack drive is shown in FIG. 4.

FIG. 4 shows a section of a vibration sensor 100 known from the prior art, which is for example used as a limit sensor by fill level metrology.

The vibration sensor 100 comprises a vibrating membrane 90 excitable by a piezo stack drive 11, which acts as a piezo-electric transmitting and/or receiving device, said vibrating membrane 90 exciting a mechanical vibration unit 7 arranged on the membrane 90 to vibrate.

The vibration sensor 100 comprises a piezo stack drive 11 consisting of a plurality of stacked piezo elements 15 contacted by electrodes 16, wherein a ceramic adjustment element 17 is arranged above and below the stack, and a compression element 19 made here of a metallic material is arranged. The ceramic adjustment elements 17 serve to adjust a thermal expansion coefficient between the piezo elements 15 and the compression elements 19. The compression elements 19 are designed such that a force effect is transferred over the full surface area of the piezo stack.

The piezo stack drive 11 is clamped against the membrane 90 by a clamping nut 92 using a single-piece clamping bolt 91 mated against the membrane 90, so that vibrations of the piezo stack drive 11 are effectively transferred to the membrane 90 and vice versa. Electrodes 16 for contacting the piezo elements 15 are contacted with connecting lines 31, which are routed on the exterior of the piezo stack drive 11 and are routed on the rear to an electronic sensor component. A sensor housing 98 is arranged on the membrane 90 on an outer edge extending to the rear, the sensor housing 98 either being connected to the edge of the membrane 90 or formed as a single piece with the latter.

Based on the requirements known from the prior art, it is considered disadvantageous when the piezo stack drive is only mounted in the vibration sensor and can also only be pre-loaded there. It is increasingly required that the drive is pre-mounted and, if necessary, tempered or operated for a specific time in the pre-assembled state, so that the elements of the drive can already be set in advance, thus avoiding a loss of the pre-load or the tempering of the entire sensor. In addition, there is a desire for drives with piezo elements arranged as full surface area circular slices, thus making a larger area of piezo elements available to generate the drive output.

Furthermore, the membrane must be formed relatively thick for a pre-load by way of a bolt arranged on the membrane in order to create a fastening point for the rod-shaped bolt. This requirement is contradictory to the general requirement that the membrane must be relatively thin to reduce the energy required to operate the vibration sensor and that must be generated by the drive. A thin membrane can be significantly easier excited to vibrate, thus resulting in the requirement to reduce the thickness of the membrane.

For a construction with a centrally arranged bolt, the installed drive works under tension, i.e. an expansion of the drive-in axial direction pulls the membrane inward with the bolt, thus causing a vibration of the membrane. For high pressure, the membrane is also bowed inward under pressure, which can lead to a loss of pre-load of the drive and thus a loss of drive output.

Therefore, the task of the present invention is to provide an assembly arrangement for a drive of a vibration sensor that allows a secure fastening relative to the membrane, while also reducing the thickness of the membrane. In addition, it is a task of the present invention to specify a vibration sensor with such an assembly arrangement.

This task is accomplished by means of an assembly arrangement having the features of claim 1, a vibration sensor with the features of claim 6, and by a method for fastening an assembly arrangement with the features of claim 13.

BRIEF SUMMARY OF THE INVENTION

In a preferred embodiment, an assembly arrangement (10) to connect a membrane (90) of a vibration sensor (100) to a drive unit (1) such that vibrations of the drive unit (1) are transferred to the membrane (90) and vibrations of the membrane (90) are transferred to the drive unit (1), characterized in that the assembly arrangement (10) is formed as a cylindrical sleeve comprising a fastening section (12) on one end for indirect or direct fastening to the membrane (90) or to an element connected with the membrane (90), and an insertion opening (14) for the drive unit (1) on the other end.

In another preferred embodiment, the assembly arrangement (10) as described herein, characterized in that the fastening section (12) is formed as at least a partially circumferential flange extending in the radial direction (R) of the sleeve (10).

In another preferred embodiment, the assembly arrangement (10) as described herein, characterized in that a part of a bayonet lock is formed by the flange (12).

In another preferred embodiment, the assembly arrangement (10) as described herein, characterized in that the assembly arrangement (10) comprises an anti-rotation lock (13) that acts together with the membrane (90) or an element connected with the membrane (90) such that a rotation of the assembly arrangement (10) relative to the membrane (90) is limited, preferably prevented.

In another preferred embodiment, the assembly arrangement (10) as described herein, characterized in that the anti-rotation lock (13) is formed as a recess in the flange.

In another preferred embodiment, a vibration sensor (100) having a membrane (90) that can be excited to vibrate and an assembly arrangement (10) to connect the membrane (90) to the drive unit such (1) that vibrations of the drive unit (1) are transferred to the membrane (90) and vibrations of the membrane (90) are transferred to the drive unit (1), characterized in that the assembly arrangement (10) is formed as a cylindrical sleeve indirectly or directly connected on one end to the membrane (90) or to an element connected with the membrane (90), and comprising an insertion opening (14) for the drive unit (1) on the other end.

In another preferred embodiment, the vibration sensor (100) as described herein, characterized in that the membrane (90) comprises a circumferential edge (93) extending in axial direction (A) and preferably formed as a flange, and in that the assembly arrangement (10) is fastened to this edge (93).

In another preferred embodiment, the vibration sensor (100) as described herein, characterized in that the membrane (90) is circumferentially fastened to a process interface (98) and in that the assembly arrangement (10) circumferentially engages at least sectionally behind the process interface (98) in radial direction (R).

In another preferred embodiment, the vibration sensor (100) as described herein, characterized in that the process interface (98) comprises a first step (81) that extends at least sectionally along the circumference in radial direction (R).

In another preferred embodiment, the vibration sensor (100) as described herein, characterized in that the edge (93) of the membrane (90) comprises a circumferential second step (94) that springs back in radial direction (R) into which the assembly arrangement (10) engages.

In another preferred embodiment, the vibration sensor (100) as described herein, characterized in that the assembly arrangement (10) comprises an anti-rotation lock (13) that acts together with the membrane (90) or an element connected with the membrane such that a rotation of the assembly arrangement (10) relative to the membrane (90) is limited, preferably prevented.

In another preferred embodiment, the vibration sensor (100) as described herein, characterized in that the assembly arrangement (10) is inserted between the edge (93) and the process interface (98) such that the edge, the process interface (98), and the assembly arrangement (10) are welded in one work step.

In another preferred embodiment, a method for fastening an assembly arrangement (10) for a drive unit (1) on a membrane (90) of a vibration sensor (100) having the following steps:
provide a process interface (98), with first step (81) springing back in radial direction (R),
arrange a fastening section (12) formed as a cylindrical sleeve having on one end a circumferential flange (12) extending in the radial direction (R) of the sleeve for fastening to the edge (93) of the membrane (90) and on the other end an insertion opening (14) for the assembly arrangement (10) featuring the drive unit in the process interface (98) such that the fastening section and the first step (81) are aligned relative to each other,
arrange the membrane (90) with a circumferential edge (93) preferably formed as a flange extending in axial direction (A), having on the process interface (98) and the assembly arrangement a second step (94) springing back in the radial direction (R) such that the process interface (98), the membrane (90), the second step (94), and the fastening section (12) are aligned relative to each other and
weld together the edge (93), the process interface (98), and the fastening section (12) in one step.

BRIEF DESCRIPTION OF THE DRAWINGS

FIG. 4 is a line drawing evidencing a longitudinal cross-section through a vibration sensor according to the prior art (already discussed).

DETAILED DESCRIPTION OF THE INVENTION

Figure 1:
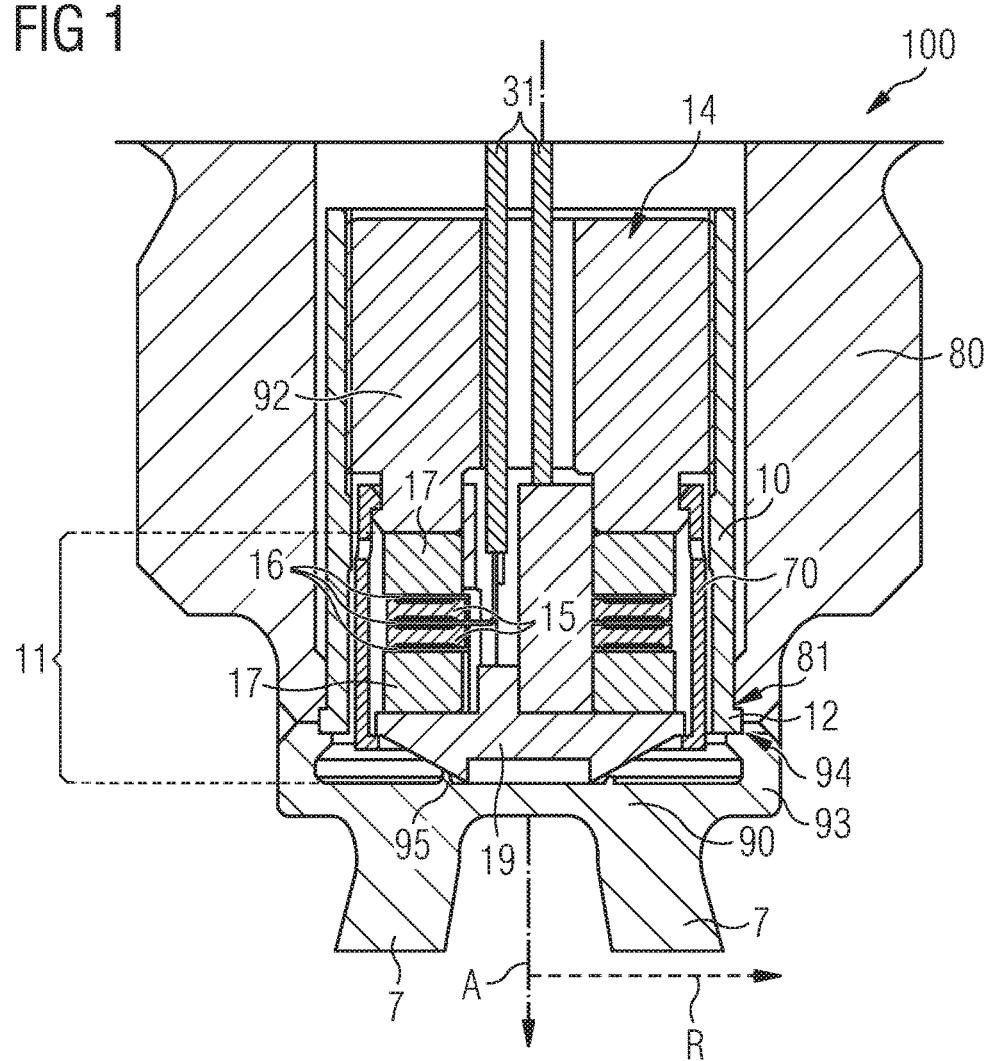
FIG. 1 is a line drawing evidencing a longitudinal cross-section through a vibration sensor with a first embodiment of an assembly arrangement.

An assembly arrangement according to the invention to connect a membrane of a vibration sensor to a drive unit such that vibrations of the drive unit are transferred to the membrane and vibrations of the membrane are transferred to the drive unit, is characterized in that the assembly arrangement is formed as a cylindrical sleeve comprising a fastening section on one end for indirect or direct fastening to the membrane or to an element connected with the membrane, and an insertion opening for the drive unit on the other end.

Because the assembly arrangement is formed as a cylindrical sleeve and the drive is arranged inside of this sleeve, a force transmission occurs between the membrane and a rear of the drive unit along the circumference of the membrane. A central tension bolt, either welded to the membrane, or formed as a single element with the membrane, is no longer necessary, so that the membrane design can be thinner. Furthermore, the drive unit is no longer operated under tension but under compression, so that increasing pressure in a process space no longer relieves the drive unit and leads to a reduction in efficiency, but instead applies more pressure on the drive to actually increase efficiency.

Preferably, the insertion opening is equipped with a pre-load option for the drive. For example, the sleeve can have an internal thread on a part facing away from the fastening section, into which a clamping screw can engage to pre-load the drive.

An indirect or direct fastening of the assembly arrangement on the membrane is this sense means that the assembly arrangement is attached to the membrane directly or with intermediate elements. A fastening according to the present application in the sense of the technical function—namely that vibrations are transferred from the drive unit to the membrane and from the membrane to the drive unit—means that the assembly arrangement is determined in axial direction relative to membrane from the membrane in the direction of the drive unit.

The fastening section can be designed as an at least partially circumferential flange extending in the radial direction of the sleeve. With such a flange, the assembly arrangement can for example engage over or behind a part of the membrane, so that the drive unit can be clamped against the membrane by means of the assembly arrangement.

If the membrane for example has as edge preferably formed as a single piece with the latter as a circumferential feature extending in axial direction and preferably formed as a flange, said perimeter can be used directly or indirectly as a locating feature for the assembly arrangement.

In an embodiment, the flange can form part of a bayonet lock. In this embodiment, the flange of the assembly arrangement can engage behind, and thus be fastened to, a counterpart of the bayonet lock formed by the perimeter.

The assembly arrangement can also have an anti-rotation lock that can act together with the membrane or an element connected to the membrane such that a rotation of the assembly arrangement relative to the membrane is limited and preferably prevented.

The anti-rotation lock can be designed for example as a recess formed in, or protrusion formed on, the flange that acts together with a corresponding element such that a rotation of the assembly arrangement is limited or prevented in the assembled state.

Such an anti-rotation lock can ensure that the drive unit can be screwed into the assembly arrangement for example with a clamping screw without having to separately secure the assembly arrangement against rotation.

A vibration sensor according to the invention having a membrane that can be excited to vibrate and an assembly arrangement to connect the membrane to a drive unit such that vibrations of the drive unit are transferred to the membrane and vibrations of the membrane are transferred to the drive unit is characterized in that the assembly arrangement is formed as a cylindrical sleeve indirectly or directly fastened on one end to the membrane or to an element connected with the membrane, and comprising an insertion opening for the drive unit on the other end.

A mechanical vibration unit to transmit the vibrations of the membrane to a medium can be arranged on the process side of the membrane.

The vibration sensor according to the invention is then characterized by a force transmission that occurs between the membrane and a rear of the drive unit along the circumference of the membrane. A central tension bolt, either welded to the membrane or formed as a single element with the membrane, is no longer necessary, so that the membrane design can be thinner. Furthermore, the drive unit is no longer operated under tension but under compression, so that increasing pressure in a process space no longer relieves the drive unit and leads to a reduction in efficiency, but instead applies more pressure on the drive to actually increase efficiency.

In an embodiment, the membrane can have a circumferential edge extending in axial direction and preferably formed as a flange, and the assembly arrangement can be attached to this edge.

Such an edge improves the stability of the membrane and permits fastening of the assembly arrangement.

The membrane can additionally be circumferentially attached to a process interface, wherein the assembly arrangement circumferentially engages at least in sections radially behind the process interface.

In this embodiment, the assembly arrangement is not directly attached to the membrane, but instead engages behind a section of the process interface, which is secured on the membrane, e.g. welded to the membrane or to the edge of the membrane described above. In this way, the assembly arrangement can be particularly easily attached to the membrane.

In order to achieve an alignment of the assembly arrangement relative to the process interface and thus also relative to the membrane, the process connection can have a first step circumferentially extending radially in sections, into which the assembly arrangement can be located with the fastening section. The assembly arrangement can thus directly radially engage behind the process interface in the area of the first step. This means that a radius of the assembly arrangement in this area is greater than a radius of the recess in the process interface, so that the assembly arrangement is friction-locked in axial direction.

In addition, or alternatively, the edge of the membrane can have a circumferential second step that springs back in radial direction, and into which the assembly arrangement engages. This second step can also serve for the centered alignment of the assembly arrangement relative to the membrane.

The assembly arrangement can also have an anti-rotation lock that can act together with the membrane or an element connected to the membrane such that a rotation of the assembly arrangement relative to the membrane is prevented.

Such an anti-rotation lock creates a simple way to secure the assembly arrangement relative to the membrane and thus also circumferentially relative to the process interface connected to the membrane, so that the assembly arrangement does not have to be additionally secured when inserting and pre-loading the drive unit.

Preferably, the assembly arrangement is inserted between the edge and the process interface used such that the edge, the process interface, and the assembly arrangement can be welded together in a work step. Such a design permits a simple assembly of the entire vibration sensor. Preferably, the edge and the process interface have equal steps corresponding to each other, between which the circumferential flange of the assembly arrangement can be located. The membrane and the process interface are aligned relative to each other by the assembly arrangement positioned between the steps.

A method according to the invention for fastening an assembly arrangement for a drive unit to a membrane of a vibration sensor has the following steps:
provide a process interface having a first step that springs back in radial direction,
arrange a fastening section formed as a cylindrical sleeve having on one end a flange extending radially along the circumference of the sleeve for fastening to the edge of the membrane, and having on the other end an insertion opening for the assembly arrangement comprising a drive unit arranged in the process interface such that the fastening section and the first step are aligned relative to each other,
arrange the membrane with a circumferential edge preferably formed as an axially extending flange, having a second step on the process interface and the assembly arrangement that springs back in radial direction such that the process interface, the membrane, the second step, and the fastening section are aligned relative to one another, and
weld the edge to the process interface and the fastening section in one step.

The method according to the invention in total simplifies the assembly of the vibration sensor since the individual components are self-centering.

Because the assembly arrangement is not formed as a single piece with the process interface or the membrane, different materials can be used for all components. In particular, the assembly arrangement can be made from a material with matched thermal expansion coefficients, e.g. titanium, whereas the process interface can be made from a more cost-effective material. Output losses caused by a reduced pre-load of the drive unit due to thermal expansion can thus be largely avoided.

A compression screw for the pre-load of the drive against the membrane should have a thickness, preferably a thread engagement with the assembly arrangement of at least the five-fold thickness of the membrane in order to prevent the compression screw from bending when the drive is operated.

DETAILED DESCRIPTION OF THE FIGURES

FIG. 1 shows a longitudinal cross-section through a vibration sensor 100 with a first embodiment of an assembly arrangement 10 according to the present application.

In the exemplary embodiment shown here, the vibration sensor 100 comprises a membrane 90 that can be excited to vibrate by a drive unit 1. In the exemplary embodiment shown here, the drive unit 1 comprises a drive shown as a piezo stack drive 11. On the drive side, a circumferential edge 93 extending in axial direction A is arranged on the membrane 90, onto which a process interface 80 is attached. A mechanical vibration unit 7 not fully shown here is arranged on a side of the membrane 90 facing away from the drive unit 1. The mechanical vibration unit 7 is suitably formed to transfer vibrations of the membrane 90 to a medium surrounding the mechanical vibration unit 7.

In the exemplary embodiment shown, the drive unit 1 is fastened to the membrane 90 by an assembly arrangement 10, formed here as a cylindrical sleeve, and clamped against said membrane 90 by clamping screw 92. The assembly arrangement 10 comprises a fastening section 12 for fastening to the membrane 90, the fastening section 12 in the present exemplary embodiment extending as a circumferential flange in radial direction R, which is formed on an end of sleeve 10 facing the membrane 90. In the exemplary embodiment shown here, the flange 12 is located between a circumferential first step 81, which is formed on the interior of a membrane-facing end of the process interface 80 that springs back in radial direction R, and a second step 94 circumferentially formed in edge 93 of membrane 90 and that is likewise designed to spring back in radial direction R.

In the exemplary embodiment shown here, the first step 81 and the second step 94 are formed such that the flange 12 is positioned in a shape-locking manner between the steps 81, 94, wherein an extension of the flange 12 is overclamped half-way in axial direction A by the first step 81 and the second step 94 each.

In the exemplary embodiment shown here, the piezo stack drive 11 is formed by a stack of two piezo elements 15 having electrodes 16 arranged between as well as above and below the piezo elements for electrically contacting to the piezo elements 15, wherein a ceramic adjustment element 7 each is formed above and below in the stack to match the thermal expansion coefficients of the piezo elements 15 to the compression elements 19 arranged below and to the clamping screw 92 acting on the stack from above. The clamping screw 92 engages into an internal thread of the assembly arrangement 10 and thus allows the piezo stack drive 11 to be clamped against the membrane. In the exemplary embodiment shown here, the compression element 19 is formed with a conical taper, so that a force applied by the drive unit 11 is transferred onto the membrane 90 in a circular line formed by the compression element 19.

In order to align the drive unit 1 in relation to the membrane 9 [sic: 90], the membrane 90 comprises a centering aid 95 designed as a ring-shaped circumferential flange, within which the conical compression element 19 is located self-centering in the process interface 80 and when inserting the drive unit 1.

In the exemplary embodiment shown here, the clamping screw 92 has a central opening through which connecting lines 31 are guided to contact the piezo elements 15. Furthermore, a thread engagement of the clamping screw 92 is designed with a length that corresponds to at least the five-fold thickness of the membrane 90, so that a force generated in the piezo stack drive 11 is reliably directed toward the membrane 90 and does not cause a deformation of the clamping screw 92. In axial direction A, the clamping screw 92 also comprises on the thread engagement in the direction of the membrane a section without thread engagement that is suitably sized to compensate the different thermal expansion coefficients of the assembly arrangement 10 and the piezo stack drive 11.

The piezo stack drive 11 can be pre-assembled together with the clamping screw 92 outside of the vibration sensor 100 using an assembly aid 70, wherein the assembly aid 70 is designed such that the individual components of the piezo stack drive 11 are sequentially inserted into the assembly aid 70 and the individual components engage into the assembly aid 70 with a spring mechanism, so that a separately handled unit is formed together with the clamping screw 92.

Figure 2:
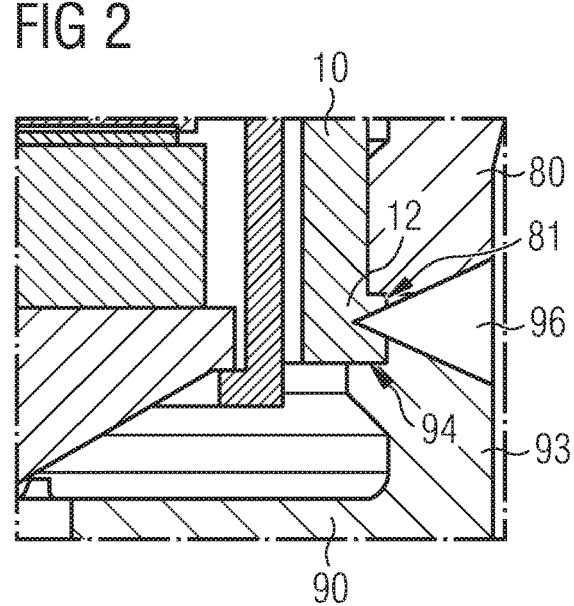
FIG. 2 is a line drawing evidencing an enlarged cross-section of FIG. 1.

FIG. 2 shows an enlarged cross-section of the fastening section 12 of the assembly arrangement 10. The figure shows the section where the edge 93 of the membrane 90 and the process interface 80 meet, wherein the flange 12 of the assembly arrangement 10 is located between the first step 81 of the process interface 80 and the second step 94 of the edge 93. FIG. 2 particularly clearly shows that the process interface 80 and the edge 93 of the membrane 90 are connected together with a weld seam 96. In the exemplary embodiment shown here, the weld seam 96 is formed such that the weld extends through the process interface 80 and the edge 93 in the area of steps 81, 94, and such that the fastening section 12 of the assembly arrangement 10 formed as a flange is also welded together. In this way, the assembly arrangement 10 is not only secured in axial direction A by being positioned onto steps 81, 94, but also in circumferential direction by welding. This ensures that the assembly arrangement 10 does not have to be additionally secured with the clamping screw 92 when threading in the drive unit 1, and that the assembly arrangement 10 is instead also secured in the circumferential direction by welding together with the process interface 80 and the edge 93.

Figure 3:
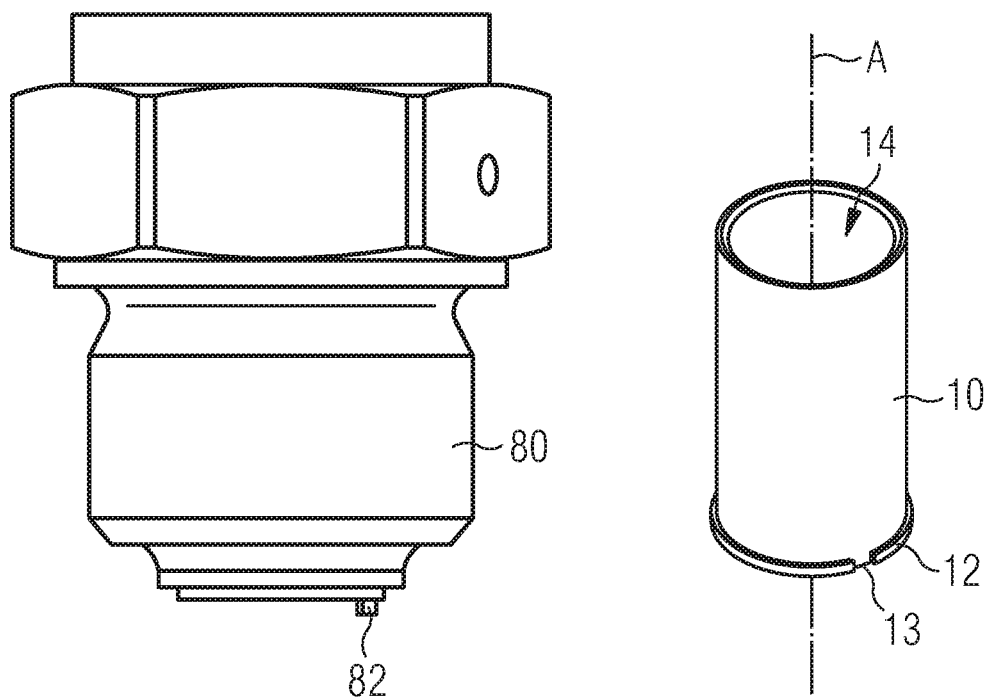
FIG. 3 is a line drawing evidencing a process interface and a second exemplary embodiment of an assembly arrangement with an anti-rotation lock.

In a further exemplary embodiment, FIG. 3 shows a process interface 80 having an assembly arrangement 10, wherein the assembly arrangement comprises an anti-rotation lock 13 in the area of the fastening section 12. In the exemplary embodiment shown here, the anti-rotation lock 13 is designed as a recess in the fastening section 12 formed as a circumferential flange, wherein a boss 82 formed onto the process interface 80 engages into this recess 13 of the anti-rotation lock, thus preventing a rotation of the assembly arrangement 10 relative to the process interface 80. In this exemplary embodiment, a welding and resulting securing of the assembly arrangement 10 is not necessary relative to the process interface 80 and the edge 93 of the membrane 90 since movement in circumferential direction is prevented by the engagement of the boss 82 in recess 13. A movement in axial direction A is in turn prevented by the fact that the fastening section 12 is formed as a circumferential flange that is clamped into process interface 80 at least extending away in axial direction A from membrane 90 due to a smaller radius of the process interface 80.

LIST OF REFERENCE NUMBERS

1 Drive unit
7 Mechanical vibration unit
10 Assembly arrangement/sleeve
11 Piezo stack drive
12 Fastening section/flange
13 Anti-rotation lock
14 Insertion opening
15 Piezo element
16 Electrodes
17 Ceramic adjustment element
19 Compression element
31 Connecting lines
70 Assembly aid
80 Process interface
81 First step
89 Insulating sleeve
90 Membrane
91 Bolt
91 Clamping screw
93 Edge
94 Second step
95 Centering aid
96 Weld seam
98 Sensor housing
100 Limit sensor/vibration sensor
A Axial direction
R Radial direction Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. An assembly arrangement to connect a membrane of a vibration sensor to a drive unit such that vibrations of the drive unit are transferred to the membrane and vibrations of the membrane are transferred to the drive unit, wherein the assembly arrangement is formed as a cylindrical sleeve comprising a fastening section on one end for indirect or direct fastening to the membrane or to an element connected with the membrane, and an insertion opening for the drive unit on the other end, wherein the membrane is circumferentially fastened to a process interface and the assembly arrangement circumferentially engages at least sectionally behind the process interface in the radial direction of the sleeve.

2. The assembly arrangement of claim 1, wherein the fastening section is formed as at least a partially circumferential flange extending in the radial direction of the sleeve.

3. The assembly arrangement of claim 1, wherein a part of a bayonet lock is formed by a flange.

4. The assembly arrangement of claim 1, wherein the assembly arrangement comprises an anti-rotation lock that acts together with the membrane or an element connected with the membrane such that a rotation of the assembly arrangement relative to the membrane is limited or prevented.

5. The assembly arrangement of claim 4, wherein the anti-rotation lock is formed as a recess in a flange.

6. A vibration sensor comprising a membrane that can be excited to vibrate and an assembly arrangement to connect the membrane to a drive unit such that vibrations of the drive unit are transferred to the membrane and vibrations of the membrane are transferred to the drive unit, wherein the assembly arrangement is formed as a cylindrical sleeve indirectly or directly connected on one end to the membrane or to an element connected with the membrane, and comprising an insertion opening for the drive unit on the other end, wherein the membrane is circumferentially fastened to a process interface and the assembly arrangement circumferentially engages at least sectionally behind the process interface in the radial direction of the sleeve.

7. The vibration sensor of claim 6, wherein the membrane comprises a circumferential edge extending in axial direction and preferably formed as a flange, and in that the assembly arrangement is fastened to this edge.

8. The vibration sensor of claim 6, wherein the process interface comprises a first step that extends at least sectionally along the circumference of the process interface in the radial direction of the sleeve.

9. The vibration sensor of claim 8, wherein the edge of the membrane comprises a circumferential second step that springs back in the radial direction of the sleeve into which the assembly arrangement engages.

10. The vibration sensor of claim 6, wherein the assembly arrangement comprises an anti-rotation lock that acts together with the membrane or an element connected with the membrane such that a rotation of the assembly arrangement relative to the membrane is limited, preferably prevented.

11. The vibration sensor of claim 8, wherein the assembly arrangement is inserted between the edge and the process interface such that the edge, the process interface, and the assembly arrangement are welded in one work step.

12. A method for fastening an assembly arrangement for a drive unit on a membrane of a vibration sensor having the following steps:

providing a process interface, with a first step springing back in the radial direction of the arrangement, arranging a fastening section formed as a cylindrical sleeve having on one end a circumferential flange extending in the radial direction of the sleeve for fastening to the edge of the membrane and on the other end an insertion opening for the assembly arrangement featuring the drive unit in the process interface such that the fastening section and the first step are aligned relative to each other, arranging the membrane with a circumferential edge formed as a flange extending in the axial direction of the sensor, having on the process interface and the assembly arrangement a second step springing back in the radial direction of the arrangement such that the process interface, the membrane, the second step, and the fastening section are aligned relative to each other and welding together the edge, the process interface, and the fastening section in one step.

* * * * *